United States Patent
Deshpande et al.

(10) Patent No.: US 9,715,405 B2
(45) Date of Patent: Jul. 25, 2017

(54) EFFICIENT COORDINATION ACROSS DISTRIBUTED COMPUTING SYSTEMS

(71) Applicant: International Business Machines Corporation, Armonk, NY (US)

(72) Inventors: Ashwini A. Deshpande, Bangalore (IN); Anubhuti Kaushik, New Delhi (IN); Ian J. Mitchell, Eastleigh (GB); Hariharan N. Venkitachalam, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 721 days.

(21) Appl. No.: 14/033,783

(22) Filed: Sep. 23, 2013

(65) Prior Publication Data

US 2015/0088956 A1    Mar. 26, 2015

(51) Int. Cl.
G06F 15/16 (2006.01)
G06F 9/46 (2006.01)
H04L 29/08 (2006.01)

(52) U.S. Cl.
CPC ............. G06F 9/466 (2013.01); H04L 67/10 (2013.01)

(58) Field of Classification Search
CPC .................................................. G06F 9/466
USPC ......................................................... 709/201
See application file for complete search history.

(56) References Cited

U.S. PATENT DOCUMENTS

| 6,839,732 | B1 | 1/2005 | Vincent et al. |
| 7,257,605 | B2 | 8/2007 | Murthy |
| 7,526,489 | B2 | 4/2009 | Alves et al. |
| 7,636,873 | B2 | 12/2009 | Lacombe et al. |
| 7,668,833 | B2 | 2/2010 | Robinson |
| 7,917,651 | B2 | 3/2011 | Khan et al. |
| 7,996,837 | B2 | 8/2011 | Chesebro et al. |
| 8,001,546 | B2 | 8/2011 | Felt et al. |
| 9,348,641 | B2 | 5/2016 | Mupparti et al. |
| 2003/0195763 | A1* | 10/2003 | Gulcu ................. G06Q 10/10 705/7.27 |
| 2004/0078495 | A1* | 4/2004 | Mousseau ............. G06F 9/44 710/1 |
| 2006/0179125 | A1* | 8/2006 | Pavlik .................. G06F 9/465 709/219 |
| 2006/0282524 | A1* | 12/2006 | Lacombe ............. G06F 9/542 709/224 |
| 2007/0288934 | A1* | 12/2007 | Khan .................. G06F 9/466 719/318 |
| 2008/0243865 | A1* | 10/2008 | Hu ................. G06F 17/30575 |
| 2008/0250074 | A1 | 10/2008 | Parkinson |

(Continued)

OTHER PUBLICATIONS

Turban, Aronson, and Liang, Decision Support Systems and Intelligent Systems, Seventh Edition, © 2005 Prentice Hall, Decision Support Systems and Intelligent Systems, 7th Edition, Turban, Aronson, and Liang.*

(Continued)

*Primary Examiner* — Hamza Algibhah
(74) *Attorney, Agent, or Firm* — Isaac J. Gooshaw

(57) ABSTRACT

A first computer of a distributed computing system receives a request for a transaction. The transaction is an eXtended Architecture (XA) protocol based global transaction. The first computer generates a unique identifier for the request. The first computer sends the unique identifier to a second computer of the distributed computing system. The unique identifier enables the second computer to participate with the first computer as an XA protocol based resource participant.

14 Claims, 5 Drawing Sheets

(56) References Cited

U.S. PATENT DOCUMENTS

| | | | |
|---|---|---|---|
| 2010/0169284 A1* | 7/2010 | Walter | G06F 11/1474 707/682 |
| 2013/0007539 A1 | 1/2013 | Ananthapadmanabh et al. | |
| 2013/0086018 A1* | 4/2013 | Horii | G06F 17/30362 707/703 |
| 2013/0246569 A1* | 9/2013 | Shen | G06F 9/466 709/217 |
| 2013/0246864 A1 | 9/2013 | Ananthapadmanabh et al. | |
| 2013/0290243 A1* | 10/2013 | Hazel | G06F 17/30185 707/607 |
| 2014/0279986 A1* | 9/2014 | Mupparti | G06F 9/466 707/703 |
| 2014/0280871 A1 | 9/2014 | Brown | |
| 2014/0317070 A1* | 10/2014 | Kesavan | G06F 17/30371 707/703 |
| 2014/0330767 A1* | 11/2014 | Fowler | G06F 9/466 707/607 |
| 2015/0088810 A1 | 3/2015 | Deshpande et al. | |

OTHER PUBLICATIONS

Moore et al., "Managing Information Access to an Enterprise Information System Using J2EE and Services Oriented Architecture", First Edition (Jan. 2005), Version 5.1 of WebSphere Business Integration Server Foundation and Version 5.1 of WebSphere Studio Application Developer Integration Edition, Copyright International Business Machines Corporation 2005, <ibm.com/redbooks>.

Miszczyk, "Bridge the Legacy-to-Java Transition with DB2 for i5/OS Distributed Transactions", May 8, 2007, <http://www.mcpressonline.com/database/db2/bridge-the-legacy-to-java-transition-with-db2-for-i5os-distributed-transactions.html>.

"Working with Transaction in Oracle Bpel | Oracle Fusion Middleware", Jun. 26, 2010, <http://www.soabyte.com/2010/06/working-with-transaction-in-oracle-bpel.html>.

U.S. Appl. No. 13/172,825, entitled "Method for Native Program to Inherit Same Transaction Context When Invoked by Primary Program Running in Separate Environment", filed Jun. 30, 2011.

* cited by examiner

EFFICIENT COORDINATION ACROSS DISTRIBUTED COMPUTING SYSTEMS

FIELD OF THE INVENTION

The present invention relates generally to the field of transaction processing, and more particularly to transaction processing in a hybrid Enterprise Information System (EIS) environment.

BACKGROUND OF THE INVENTION

As applications servers continue to develop, there is an increasing need to integrate Java® EE (Enterprise Edition) based applications and servers with non-Java based applications and servers. In such situations, customers who are considering modernization or extension of traditional applications often utilize the option of re-hosting the non-Java based application within a Java® EE based application server using a Java Virtual Machine (JVM) environment. This propels the adaptation of new technologies for these non-Java applications by leveraging the features provided by the modern Java application server environment.

However, such an approach becomes more complex and increasingly difficult in a cloud computing environment. Cloud computing architectures can be focused on data intensive applications and can be incapable of handling Online transaction processing (OLTP). Because of the distributed nature of a global transaction, and the number of participants being involved, coordination in a global transaction can lead to a bottleneck in a cloud computing environment. In addition, latency can be greatly impacted due to the many steps involved in coordination of different Enterprise Information Systems and database resources.

SUMMARY

Embodiments of the present invention disclose a method, computer program product, and system for transaction processing in a distributed computing system. A first computer of a distributed computing system receives a request for a transaction. The transaction is an eXtended Architecture (XA) protocol based global transaction. The first computer generates a unique identifier for the request. The first computer sends the unique identifier to a second computer of the distributed computing system. The unique identifier enables the second computer to participate with the first computer as an XA protocol based resource participant.

DETAILED DESCRIPTION

Figure 1:
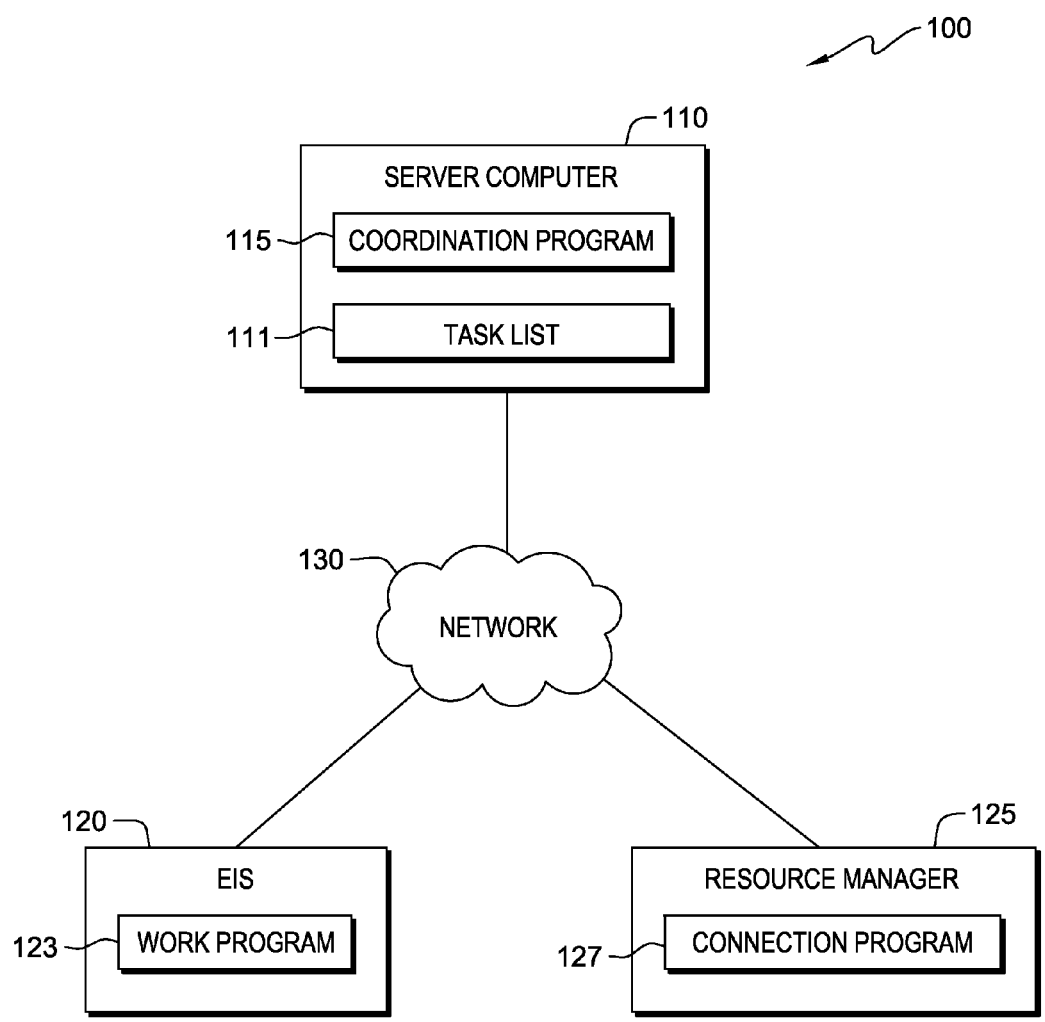
FIG. 1 is a functional block diagram illustrating a distributed computing environment, in accordance with an embodiment of the present invention.

Known solutions to integrate non-Java based Enterprise Information System (EIS) require the EIS to implement at least one of the full XA (eXtended Architecture) standard or the JCA based transaction contracts (or similar) for supporting global transaction. However, such implementation requires substantial changes to be made to the EIS programming. Such changes are often complex, time consuming, and costly.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A computer-readable signal medium may include a propagated data signal with computer-readable program code embodied therein, for example, in baseband or as part of a carrier wave. Such a propagated signal may take any of a variety of forms including, but not limited to, electromagnetic, optical, or any suitable combination thereof. A computer-readable signal medium may be any computer-readable medium that is not a computer-readable storage medium and that can communicate, propagate, or transport a program for use by, or in connection with, an instruction execution system, apparatus, or device.

Program code embodied on a computer-readable medium may be transmitted using any appropriate medium including, but not limited to, wireless, wireline, optical fiber cable, RF, etc., or any suitable combination of the foregoing.

Computer program code for carrying out operations for aspects of the present invention may be written in any combination of one or more programming languages, including an object-oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture, including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowchart and/or block diagram block or blocks.

The present invention will now be described in detail with reference to the Figures. FIG. 1 is a functional block diagram illustrating a hybrid EIS environment, generally designated 100, in accordance with one embodiment of the present invention.

Hybrid EIS environment 100 includes server computer 110, EIS 120, and resource manager 125, all interconnected over network 130. In the embodiments described herein, the combination of server computer 110, EIS 120, and resource manager 125 constitute a distributed computing system for the processing of transactions. Server computer 110 includes coordination program 115 and task list 111. EIS 120 includes work program 123. Resource manager 125 includes connection program 127.

In this exemplary embodiment, coordination program 115, task list 111, work program 123, and connection program 127 are respectively stored on server computer 110, EIS 120, and resource manager 125. However, in other embodiments, coordination program 115, task list 111, work program 123, and connection program 127 may be stored externally and accessed through a communication network 130. The communication network can be, for example, a local area network (LAN), a wide area network (WAN) such as the Internet, or a combination of the two, and may include wired, wireless, fiber optic or, any other connection known in the art. In general, the communication network can be any combination of connections and protocols that will support communications between server computer 110, coordination program 115, task list 111, EIS 120, work program 123, resource manager 125, and connection program 127, in accordance with a desired embodiment of the present invention.

In various embodiments of the present invention, server computer 110, EIS 120, and resource manager 125 can be servers, laptop computers, tablet computers, netbook computers, personal computers (PCs), desktop computers, personal digital assistants (PDAs), or smart phones. In another embodiment, server computer 110, EIS 120, and resource manager 125 represent a computing system utilizing clustered computers and components to act as a single pool of seamless resources. In general, server computer 110, EIS 120, and resource manager 125 can be any computing device, or a combination of devices, with respective access to coordination program 115, task list 111, work program 123, and connection program 127, and is capable of running coordination program 115, work program 123, and connection program 127 further respectively. Server computer 110, EIS 120, and resource manager 125 may include internal and external hardware components, as depicted and described in further detail with respect to FIG. 5.

In this embodiment, server computer 110 is a Java® based server. For example, server computer 110 can be a Java® EE based server. Conversely, EIS 120 is a non-Java based EIS that implements only a part of the eXtended Architecture (XA) protocol, i.e., EIS 120 does not implement the full XA protocol, and does not implement JCA based transaction contracts. Typically, in order to participate as an XA protocol based resource participant with server computer 110, an EIS would have to implement the full XA protocol or JCA based transaction contracts. However, through the use of unique identifiers (UIDXs), EIS 120 is enabled to participate as an XA protocol based resource participant with server computer 110 even though EIS 120 does not implement the full XA protocol or JCA based transaction contracts.

In this embodiment, resource manager 125 is an XA compliant resource manager associated with EIS 120 and server computer 110. In the illustrated embodiment, resource manager 125 functions as a resource such as database, messaging system, or any other XA compliant resource between server computer 110 and EIS 120. Since EIS 120 does not implement the full XA protocol or JCA based transaction contracts, EIS 120 and server computer 110 are not fully compatible. However, the use of unique identifier (UIDX) allows server computer 110, which is fully compliant as per the XA protocol, to coordinate the processing of transactions using EIS 120 via resource manager 125, since resource manager 125 is compatible with both EIS 120 and server computer 110.

In the illustrated embodiment, coordination program 115 coordinates the processing of a transaction using the resources of EIS 120 and resource manager 125. If coordination program 115 identifies a transaction in task list 111 that is an eXtended Architecture (XA) protocol based global transaction that requires the resources of EIS 120, then coordination program 115 generates a UIDX for that transaction. The generated UIDX is unique for each transaction identified by the server computer 110. Coordination program 115 then passes the UIDX to both EIS 120 and resource manager 125, and opens a physical connection to resource manager 125. Coordination program 115 then passes the transaction request to EIS 120. Coordination program 115 then coordinates the processing of the transaction by sending a variety of XA protocol based signals, such as "xa_end", "xa_prepare", "xa_commit", "xa_rollback", to resource manager 125 for completing the global transaction.

In the illustrated embodiment, task list 111 includes at least one received task that is an eXtended Architecture (XA) protocol based global transaction.

In the illustrated embodiment, work program 123, processes, i.e., executes the logic of a received transaction request to generate a result using the resources enlisted by resource manager 125. Once a UIDX has been received from coordination program 115, work program 123 waits for coordination program 115 to send a transaction request. Once the transaction request is received, EIS 120 opens a physical connection with resource manager 125 and sends a start signal to resource manager 125. Then EIS 120 begins to execute the logic needed to process the transaction.

In the illustrated embodiment, connection program 127, executing on resource manager 125, identifies physical connections using received UIDX (both server computer 110 and EIS 120 send the same UIDX respective to the identified transaction request). Connection program 127 responds to the identification of two separate physical connections that share the same UIDX by treating the two separate physical connections as a single logical connection. Thus, the signals, from server computer 110, being received by resource manager 125, are used to coordinate the processing of a transactional work done by EIS 120 and also the work done by the server computer 110.

Figure 2:
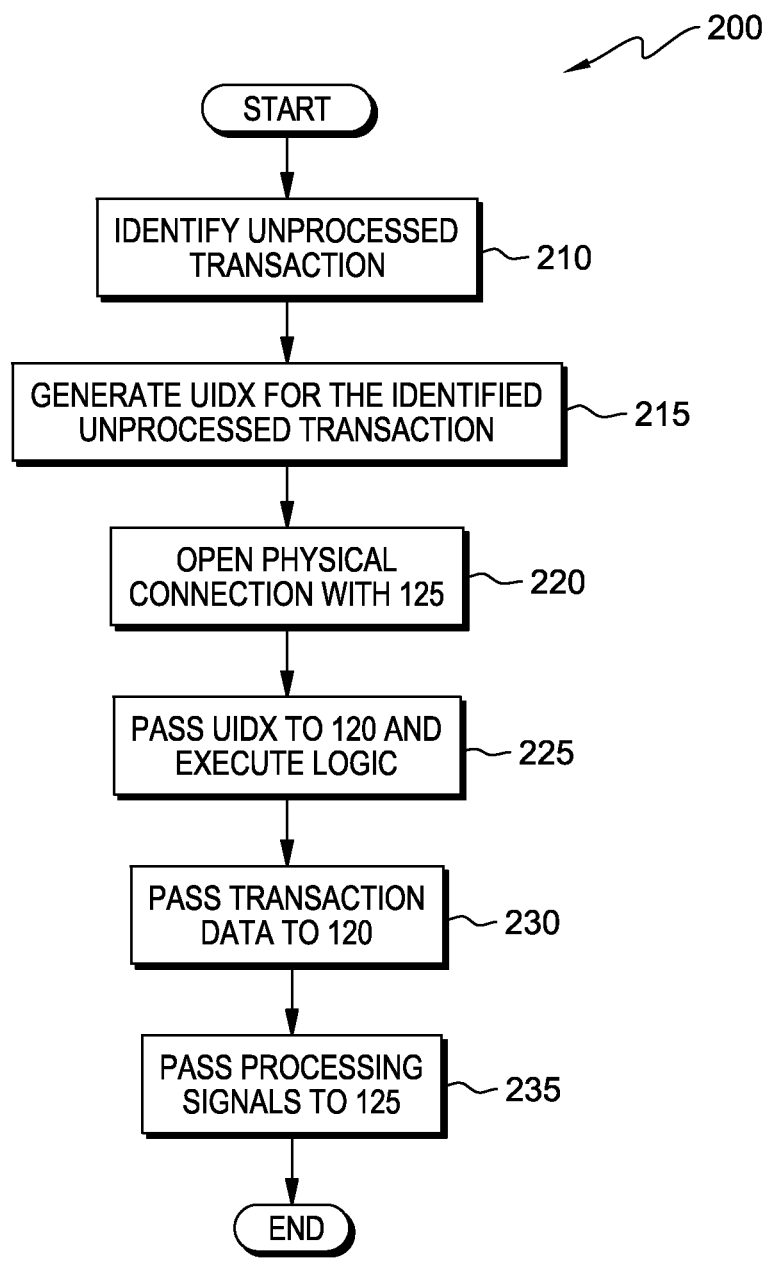
FIG. 2 is a flowchart depicting operational steps of a coordination program, executing on a server computer, for coordinating the processing of a transaction, in accordance with an embodiment of the present invention.

FIG. 2 is a flowchart depicting operational steps of coordination program 115, executing on server computer 110, for coordinating the processing of a transaction, in accordance with an embodiment of the present invention.

In step 210, coordination program 115 identifies an unprocessed transaction. Coordination program 115 accesses task list 111 and searches for tasks that have not been processed, i.e., do not have a UIDX associated with them. Coordination program 115 then generates a UIDX for an identified unprocessed transaction, in step 215.

Then, coordination program 115 opens a physical connection with resource manager 125, in step 220. Coordination program 115 opens a physical connection with resource manager 125 and passes the UIDX associated with the identified unprocessed transaction to resource manager 125. After the physical connection with resource manager 125 has been established with resource manager 125 and the UIDX associated with the identified unprocessed transaction has been passed to resource manager 125, coordination program 115 passes the UIDX to EIS 120, in step 225.

Coordination program 115 then passes transaction data to EIS 120 and executes the logic to perform its activity with resource manager 125, in step 230. Coordination program 115 accesses task list 111 and retrieves the transaction data for the identified unprocessed transaction, which is to be processed via coordinated activity of server computer 110, EIS 120, and resource manager 125. Then server computer 110 executes the logic to perform its activity with resource manager 125. Coordination program 115 then passes the transaction data for the identified unprocessed transaction to EIS 120.

Coordination program 115 passes processing signals to resource manager 125, in step 235. After EIS 120 receives the transaction data for the task to be processed EIS 120, EIS opens a physical connection with resource manager 125, using a XA interface signal, such as "xa_open( . . . )", and passes the UIDX to resource manager 125. Once EIS 120 establishes the physical connection and passes the UIDX to resource manager 125, resource manager 125 treats the two physical connections of coordination program 115 and EIS 120 as a single logical connection. Coordination program 115 then passes processing signals, such as "xa_start", to resource manager 125 to control the processing of the task executed in a global transaction across EIS 120 and server computer 110.

Figure 3:
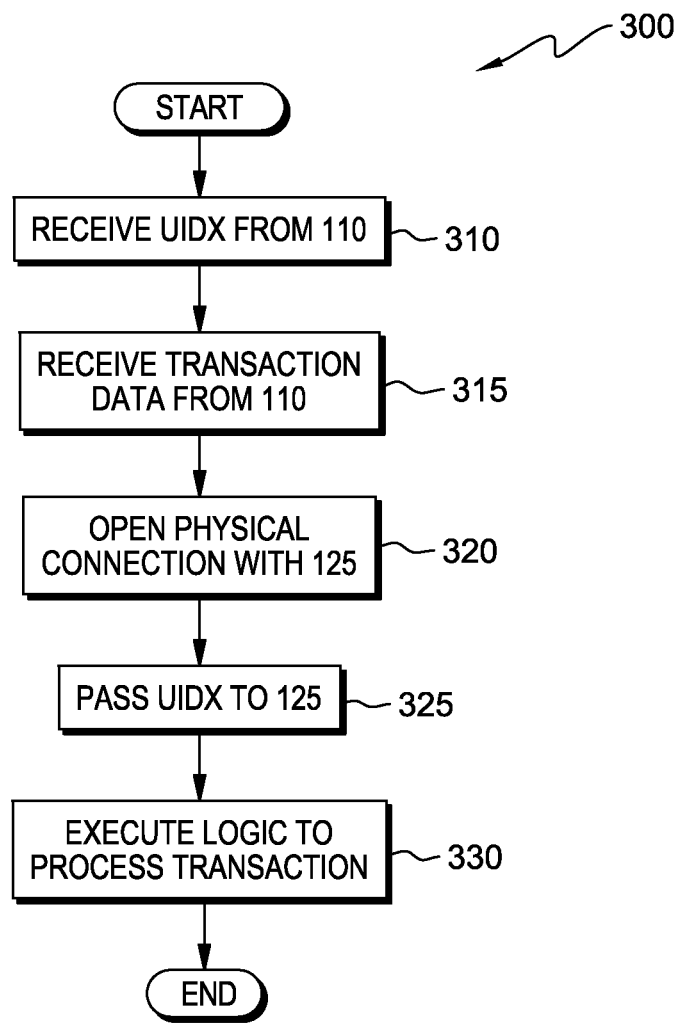
FIG. 3 is a flowchart depicting operational steps of a work program, executing on an EIS, for the processing of a received transaction request, in accordance with an embodiment of the present invention.

FIG. 3 is a flowchart depicting operational steps of work program 123, executing on EIS 120, for the processing of a received transaction request, in accordance with an embodiment of the present invention.

In step 310, work program 123 receives a UIDX from server computer 110 via coordination program 115. Work program 123 then receives the transaction data from server computer 110, in step 315. Then, in step 320, work program 123 opens a physical connection with resource manager 125. Work program 123 then passes the UIDX to resource manager 125, in step 325.

In step 330, work program 123 executes the logic to process the transaction. Work program 123 executes the logic to process the transaction by performing its activity with resource manager 125. The transactional activity of resource manager 125 is controlled via processing signals received from coordination program 115. Based on the received processing signals, resource manager 125 performs the work, executed by EIS 120, to process the transaction.

Figure 4:
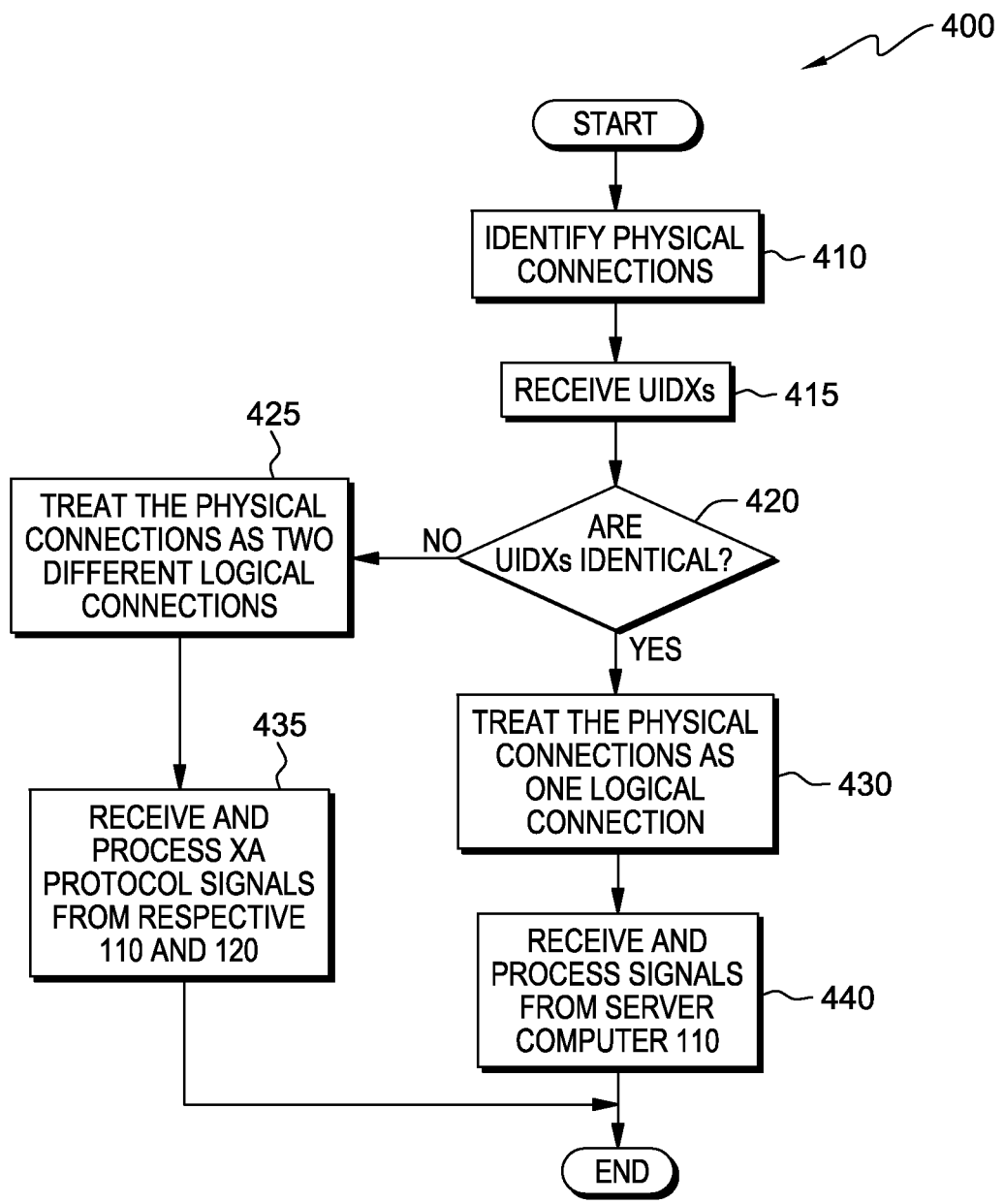
FIG. 4 is a flowchart depicting operational steps of a connection program, executing on a resource manager, for identifying physical connections using received UIDX, in accordance with an embodiment of the present invention.

FIG. 4 is a flowchart depicting operational steps of connection program 127, executing on resource manager 125, for identifying physical connections using received UIDX, in accordance with an embodiment of the present invention.

In step 410, connection program 127 identifies any physical connections that have been established. Then, in step 415, connection program 127 receives a number of UIDXs via the established physical connections.

In decision step 420, connection program 127 determines if the received UIDXs are identical. If the UIDXs are not identical (decision step 420, no branch), then connection program 127 treats the physical connections associated with the identical UIDXs as two different connections, in step 425, and then proceeds to step 435. If the UIDXs are identical (decision step 420, yes branch), then connection program 127 treats the physical connections associated with the identical UIDXs as one logical connection, in step 430, and then proceeds to step 440.

In step 435, connection program 127 receives and processes XA protocol based signals, which are sent from both coordination program 115, executing on server computer 110, and EIS 120 independently. In such a situation, resource manager 125 is configured to receive XA protocol signals from respective EIS 120 and server computer 110, i.e., resource manager 125 would "expect" to receive XA protocol signals from respective server computer 110 and EIS 120. In this exemplary embodiment, EIS 120 is not a completely XA compliant system. Thus, the execution of step 435 does not provide the most desirable coordination across hybrid EIS environment 100 as EIS 120 implements only a part of the XA protocol, i.e. EIS 120 does not implement the full XA protocol, and does not implement JCA based transaction contracts. However, the execution of step 440 does provide a more desirable coordination of transaction processing across hybrid EIS environment 100, when compared to the results of step 435.

In step 440, connection program 127 receives and processes XA protocol based signals, which are sent from coordination program 115, executing on server computer 110. Based on the received signals from server computer 110, connection program 127 coordinates the transaction between the work performed in EIS 120 and server computer 110.

Figure 5:
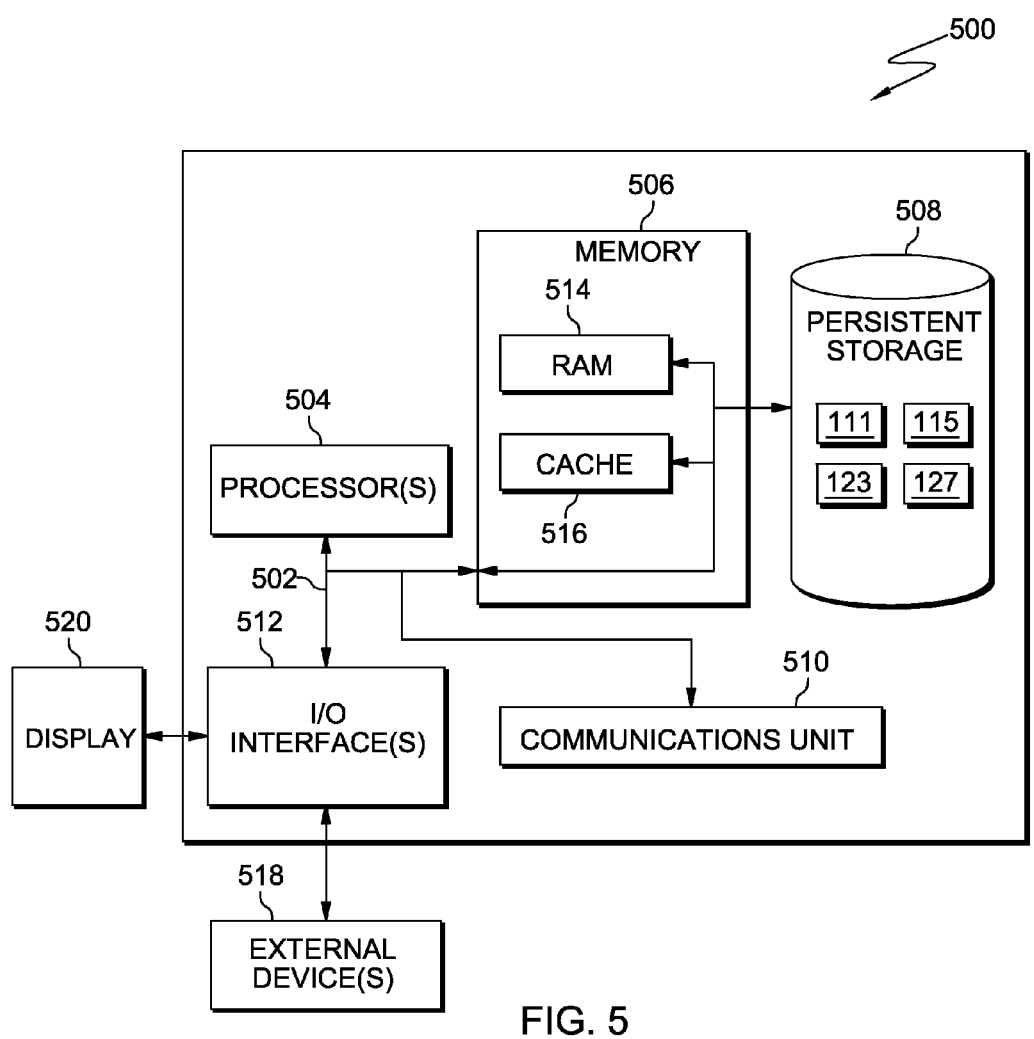
FIG. 5 depicts a block diagram of components of server computer 110, EIS 120, and resource manager 125 in accordance with an illustrative embodiment of the present invention.

FIG. 5 depicts a block diagram of components of server computer 110, EIS 120, and resource manager 125, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Server computer 110, EIS 120, and resource manager 125 respectively include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Coordination program 115, task list 111, work program 123, and connection program 127 are stored in persistent storage 508 for execution or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of server computer 110, EIS 120, and resource manager 125. In these examples, communications unit 510 includes one or more network interface cards. Communications unit 510 may provide communications through the use of either or both physical and wireless communications links. Coordination program 115, task list 111, work program 123, and connection program 127 may be downloaded to persistent storage 508 through communications unit 510.

I/O interface(s) 512 allows for input and output of data with other devices that may be respectively connected to server computer 110, EIS 120, or resource manager 125. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., coordination program 115, task list 111, work program 123, and connection program 127, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instruction(s) for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for transaction processing in a hybrid EIS environment, the computer program product comprising:
  one or more computer-readable storage media and program instructions stored on the one or more computer-readable storage media, the program instructions comprising:
    program instructions to receive, by a first computer of a distributed computing system, a request for a transaction, wherein the transaction is an eXtended Architecture (XA) protocol based global transaction, wherein the first computer implements one or both of a complete XA protocol and a JCA based transaction contract;
    program instructions to generate, by the first computer, a unique identifier for the request; and
    program instructions to send, by the first computer, the unique identifier to a second computer of the distributed computing system, wherein the second computer is, at most, partially XA compliant, the unique identifier enabling the second computer to participate as an XA protocol based resource participant with the first computer such that at least some of the computing resources of both the first computer and the second computer are used in conjunction to execute the logic needed to process the XA protocol based global transaction.

2. The computer program product of claim 1, the program instructions further comprising:
program instructions to maintain, by the first computer, a consistent state between the resources of the first computer and the resources of the second computer; and
program instructions for the transaction to be processed by the second computer.

3. The computer program product of claim 1, wherein the second computer is an Enterprise Information System (EIS), and wherein reception of the unique identifier by the second computer enables the second computer to participate as an XA protocol based resource participant that implements at least one of a complete XA protocol or a JCA based transaction contract.

4. The computer program product of claim 1, wherein the first computer is configured to host Java® based applications.

5. The computer program product of claim 1, the program instructions further comprising:
program instructions for the first computer to send the unique identifier to a third computer of the distributed computing system that is configured to be a resource manager of the second computer and the first computer; and
program instructions for the second computer to send the unique identifier to the third computer.

6. The computer program product of claim 5, the program instructions further comprising:
program instructions to respond to the reception, by the third computer, of the unique identifier from the first computer and the second computer, by identifying two separate physical connections that respectively correspond to the first computer and the second computer; and
program instructions for the third computer to treat the identified two separate physical connections as a single logical connection.

7. The computer program product of claim 6, the program instructions further comprising:
program instructions for the first computer to send a signal to the third computer, wherein the signal is used to coordinate the processing of the transaction by second computer.

8. A computer system for transaction processing in a hybrid EIS environment, the computer system comprising:
one or more computer processors;
one or more computer readable storage media;
program instructions stored on the computer readable storage media for execution by at least one of the one or more processors, the program instructions comprising:
program instructions to receive, by a first computer of a distributed computing system, a request for a transaction, wherein the transaction is an eXtended Architecture (XA) protocol based global transaction, wherein the first computer implements one or both of a complete XA protocol and a JCA based transaction contract;
program instructions to generate, by the first computer, a unique identifier for the request; and
program instructions to send, by the first computer, the unique identifier to a second computer of the distributed computing system, wherein the second computer is, at most, partially XA compliant, the unique identifier enabling the second computer to participate as an XA protocol based resource participant with the first computer such that at least some of the computing resources of both the first computer and the second computer are used in conjunction to execute the logic needed to process the XA protocol based global transaction.

9. The computer system of claim 8, the program instructions further comprising:
program instructions to maintain, by the first computer, a consistent state between the resources of the first computer and the resources of the second computer; and
program instructions for the transaction to be processed by the second computer.

10. The computer system of claim 8, wherein the second computer is an Enterprise Information System (EIS), and wherein reception of the unique identifier by the second computer enables the second computer to participate as an XA protocol based resource participant that implements at least one of a complete XA protocol or a JCA based transaction contract.

11. The computer system of claim 8, wherein the first computer is configured to host Java® based applications.

12. The computer system of claim 8, the program instructions further comprising:
program instructions for the first computer to send the unique identifier to a third computer of the distributed computing system that is configured to be a resource manager of the second computer and the first computer; and
program instructions for the second computer to send the unique identifier to the third computer.

13. The computer system of claim 12, the program instructions further comprising:
program instructions to respond to the reception, by the third computer, of the unique identifier from the first computer and the second computer, by identifying two separate physical connections that respectively correspond to the first computer and the second computer;
program instructions for the third computer to treat the identified two separate physical connections as a single logical connection.

14. The computer system of claim 13, the program instructions further comprising:
program instructions for the first computer to send a signal to the third computer, wherein the signal is used to coordinate the processing of the transaction by second computer.

* * * * *